United States Patent [19]

Stenstrom

Best Available Copy

[11] E Re. 30,310

[45] Reissued Jun. 17, 1980

[54] METHOD AND APPARATUS FOR TREATING HEAT-SENSITIVE PRODUCTS

[75] Inventor: Lennart A. Stenstrom, Huddinge, Sweden

[73] Assignee: Alfa-Laval AB, Tumba, Sweden

[21] Appl. No.: 930,647

[22] Filed: Jul. 31, 1978

Related U.S. Patent Documents

Reissue of:

[64] Patent No.: 3,809,844
Issued: May 7, 1974
Appl. No.: 176,967
Filed: Sep. 1, 1971

[30] Foreign Application Priority Data

Sep. 8, 1970 [SE] Sweden ..... 12155/70

[51] Int. Cl.[2] ..... H05B 9/06

[52] U.S. Cl. ..... 219/10.55 M; 219/10.55 A; 426/241

[58] Field of Search ..... 219/10.55 A, 10.55 M, 219/10.55 F, 10.55 R; 426/243, 237, 234, 241, 119

[56] References Cited

U.S. PATENT DOCUMENTS

| | | | |
|---|---|---|---|
| 2,485,659 | 10/1949 | Robertson . | |
| 2,838,640 | 6/1958 | Mann et al. | 219/10.41 |
| 3,092,503 | 6/1963 | Gray . | |
| 3,256,101 | 6/1966 | Arns | 219/10.55 |
| 3,335,253 | 8/1967 | Jeppson et al. | 219/10.55 A |
| 3,409,447 | 11/1968 | Jeppson | 219/10.55 A X |
| 3,470,942 | 10/1969 | Fukada et al. | 219/10.55 |
| 3,494,723 | 2/1970 | Gray | 219/10.55 A X |
| 3,494,724 | 2/1970 | Gray | 219/10.55 A X |
| 3,536,129 | 10/1970 | White | 219/10.55 M X |
| 3,556,817 | 1/1971 | Jeppson | 219/10.55 M |

FOREIGN PATENT DOCUMENTS

| | | | |
|---|---|---|---|
| 731272 | 12/1942 | Fed. Rep. of Germany . | |
| 831490 | 2/1952 | Fed. Rep. of Germany . | |
| 957179 | 1/1957 | Fed. Rep. of Germany . | |
| 2004819 | 12/1969 | France . | |
| 610520 | 11/1948 | United Kingdom . | |
| 954258 | 4/1964 | United Kingdom | 219/10.55 E |
| 1063877 | 3/1967 | United Kingdom . | |

*Primary Examiner*—Arthur T. Grimley
*Attorney, Agent, or Firm*—Davis, Hoxie, Faithfull & Hapgood

[57] ABSTRACT

Each unit of a heat-sensitive product is contacted directly or indirectly with a cooling medium so that the unit acquires a condition in which a surface layer thereof has a lower temperature than its inner portions. The product unit is then heated, by electromagnetic energy of at least microwave frequency, from this condition to substantially the desired sterilizing or pasteurizing temperature in a medium having a temperature which will permit such heating. In this way, a substantially uniform heat treatment effect is obtained in the product units.

11 Claims, 3 Drawing Figures

METHOD AND APPARATUS FOR TREATING HEAT-SENSITIVE PRODUCTS

Figure 1:
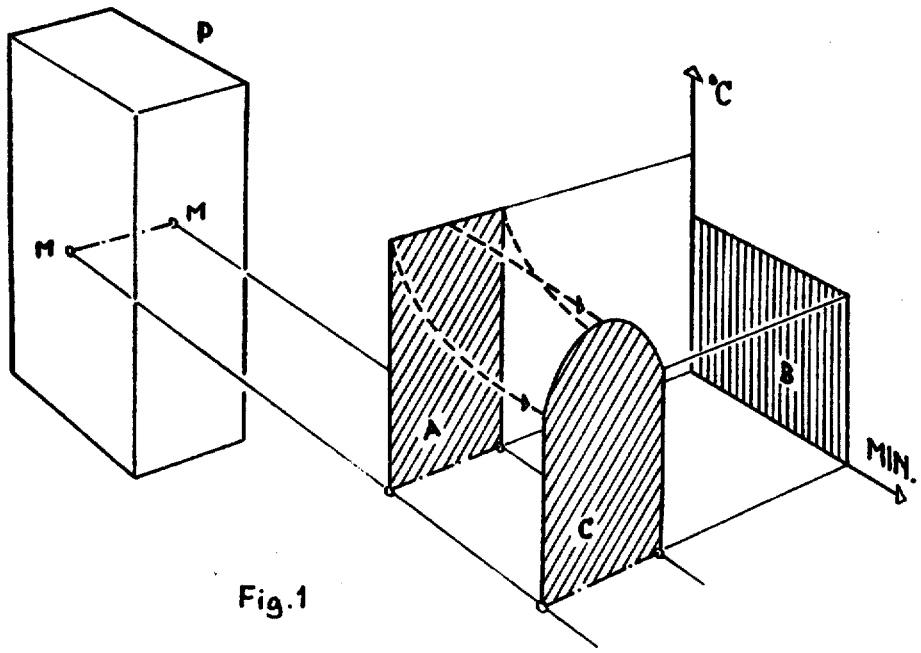

Matter enclosed in heavy brackets [ ] appears in the original patent but forms no part of this reissue specification; matter printed in italics indicates the additions made by reissue.

This invention relates to the treatment of heat-sensitive products by electro-magnetic heating thereof, and more particularly to an improved method and apparatus for this purpose.

Heat sterilization of a nutritive product means in practice that the product is subjected to a heat treatment such that the spores of the poison-producing bacteria Clostridium botulinum cannot survive. However, a heat treatment of such products in this manner normally leads to an impaired taste of the products, due to complex chemical reactions.

While the sterilization effect of a heat treatment depends substantially upon the temperature during the heat treatment, the chemical effects (many of which are developed to a harmful extent when a critical temperature range typical for the product is obtained) depend to a higher degree than the sterilization effect upon the length of time during which the heat treatment is effected. Therefore, it is desirable in connection with heat sterilization or pasteurization of food-stuffs to use so called HTST-processes, i.e., heat treatment at high temperature for a short time. (HTST is short for High Temperature Short Time.)

HTST-processes have long been available for treating fluid and semi-fluid products. For these products, a rapid and effective heat transfer in a conventional manner, together with a subsequent aseptic filling into packages, have been rather easily performed. For solid products, however, HTST-processes have not been carried out satisfactorily so far.

It was understood for many years that electro-magnetic energy, due to its special capability of heating the inner parts of a product, should enable a heat treatment of solid food-stuffs substantially in the manner of the HTST-processes as to rapidity and intensity. However, in spite of intensive development work in the field, no satisfactory method has been developed heretofore. Several test runs have been made for heating solid product units to to sterilizing or pasteurizing temperature in an electro-magnetic field, and although it was eventually possible to obtain a substantially uniform field strength across a considerable area of a field, it was recognized that product units treated in the field are still unevenly heated. It was found that the edge portions of the product units, as viewed in the main direction of the application of the electro-magnetic field against the product units in a practical frequency range for economic heating, obtained quite a different temperature than other portions of the product units. Further, it has proved that the effect of the electro-magnetic field was damped gradually when penetrating into a product unit, so that product units treated in the field were less heated in their central parts than at their surfaces. This has made a sufficient heat treatment effect in a product unit unachievable, when attempting to sterilize or pasteurize it, unless certain portions of the product unit were so strongly heated that they were spoiled in one respect or another.

In order to solve these problems, it has been attempted to provide means for applying an electro-magnetic field such that an even energy conversion is obtained in product units inserted in the field. So far, this has not given the desired result, however. It has also been attempted to pre-heat product units in a conventional manner prior to heating them in an electro-magnetic field. This has led to an effect contrary to the desired one, however, probably because conventional heating (to an even higher degree than heating in an electro-magnetic field) leads to a greater temperature rise in the edges and surface of the product unit than in the inner parts of it.

The principal object of the present invention is to provide a solution to the problem of sterilizing or pasteurizing separate units of a heat-sensitive product by heating it by electro-magnetic energy in a way such that a substantially even heat treatment effect is obtained in the product units.

According to the present invention, each product unit is contacted directly or indirectly with a cooling medium, so that a surface layer of the product unit acquires a lower temperature than its inner portions. The product unit is then heated by means of electro-magnetic energy of at least microwave frequency from the above-mentioned condition to substantially the desired sterilizing or pasteurizing temperature in a medium having a temperature which will permit this.

This method provides at an early stage (i.e., before the product unit is subjected to too high a temperature) a compensation for the uneven heating taking place in the electro-magnetic field. This makes it possible to obtain a sufficient heat treatment effect in the entire product unit without certain portions of it becoming heated so strongly that they are spoiled in one respect or another.

It is not absolutely necessary to provide for a complete compensation for the uneven heating in the electro-magnetic field. Preferably, the edge portions and the surface of the product unit are allowed to acquire a somewhat higher temperature in the electro-magnetic field than the interior of the product unit, since it takes a longer time to cool the interior of the product unit than the outer portions of it. A satisfactory heat treatment effect, therefore, can be achieved also by keeping the outer portions of the product unit at a certain temperature during a certain period of time, while the inner portions of the product unit are kept at a somewhat lower temperature during a somewhat longer period of time.

As the edge portions and corners of the product unit are heated by the microwave field substantially more than other parts of the product unit surface, it is suitable to surround the product unit entirely by said cooling medium, so that these edge portions and corners will be cooled to an extra extent.

Preferably, the product unit during its heating in the field of electro-magnetic energy is surrounded, at least as seen in the main direction of application of the field against the product unit, by a medium having a dielectric constant of at least half of that of the product unit for the particular field. It has proved that this substantially contributes to equalizing the electro-magnetic field effect on the product unit as seen in said main direction for applying the field against the product unit. Preferably, a liquid is used for this purpose which has a dielectric constant adapted to that of the product (e.g., water with possible additives, such as salt, sugar, starch and fat emulsion). The same liquid, before the heating in the electro-magnetic field, can have been used as cooling medium for said cooling of the surface layer of the product unit.

If the medium surrounding the product unit in the electro-magnetic field is of a kind that absorbs electro-magnetic energy, the starting temperature of this medium is controlled so that the medium, when the electro-magnetic heating is completed, has been heated by the electro-magnetic field to substantially the same temperature as the desired sterilizing or pasteurizing temperature in the surface layer of the product unit. If the product unit is moved at one speed and the surrounding medium at another speed through the electro-magnetic field, the relative speed between the product unit and the surrounding medium is controlled so that the medium where the product leaves the field has been heated by the field to substantially the same temperature as the desired sterilizing or pasteurizing temperature in the surface layer of the product unit.

The present invention also relates to an apparatus for performing the above-described method. This apparatus comprises a number of adjacent vertical chambers which so communicate in sequence with each other at their upper and lower portions that they constitute interconnected vertical parts of one long sinuous channel, at least some chambers being partly filled with liquid. Means are provided for transporting product units through the channel. In an intermediate region of the channel, a super-atmospheric gas pressure is maintained so that liquid in chambers communicating with each other at their lower ends is adjusted to different levels, the gas pressure in chambers communicating with each other at their upper ends being lower than the gas pressure in said region. The apparatus is characterized by means for applying an electro-magnetic field of at least microwave frequency in a high pressure zone of the channel, the media in the different chambers being maintained at such temperatures that a product unit transported through the channel toward said high pressure zone is subjected to a cooling medium before its entrance into the electro-magnetic field, so that it has a lower temperature in its surface layer than in its interior when entering the electro-magnetic field.

In the apparatus according to the invention, the surface layer of the product units may be cooled by means of either liquid or gas. Further, if pre-heating of the product units is found to be suitable, it can be effected by either gas or liquid. It is possible, of course, to heat the product units by means of one kind of medium and cool them by means of the other kind of medium. According to a preferred embodiment of the new apparatus, the arrangement is such that the product units on their way to said zone pass first through a number of hot liquid baths and then through a number of cooler liquid baths. In this embodiment, said zone is situated in a liquid-filled chamber. Preferably, a part of the liquid in this chamber may be used for cooling of the surface layer of the product units before they enter the heating zone.

Figure 2:
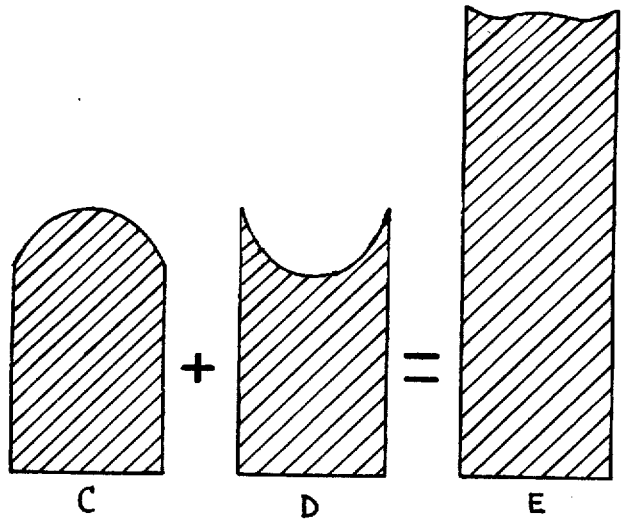
Figure 3:
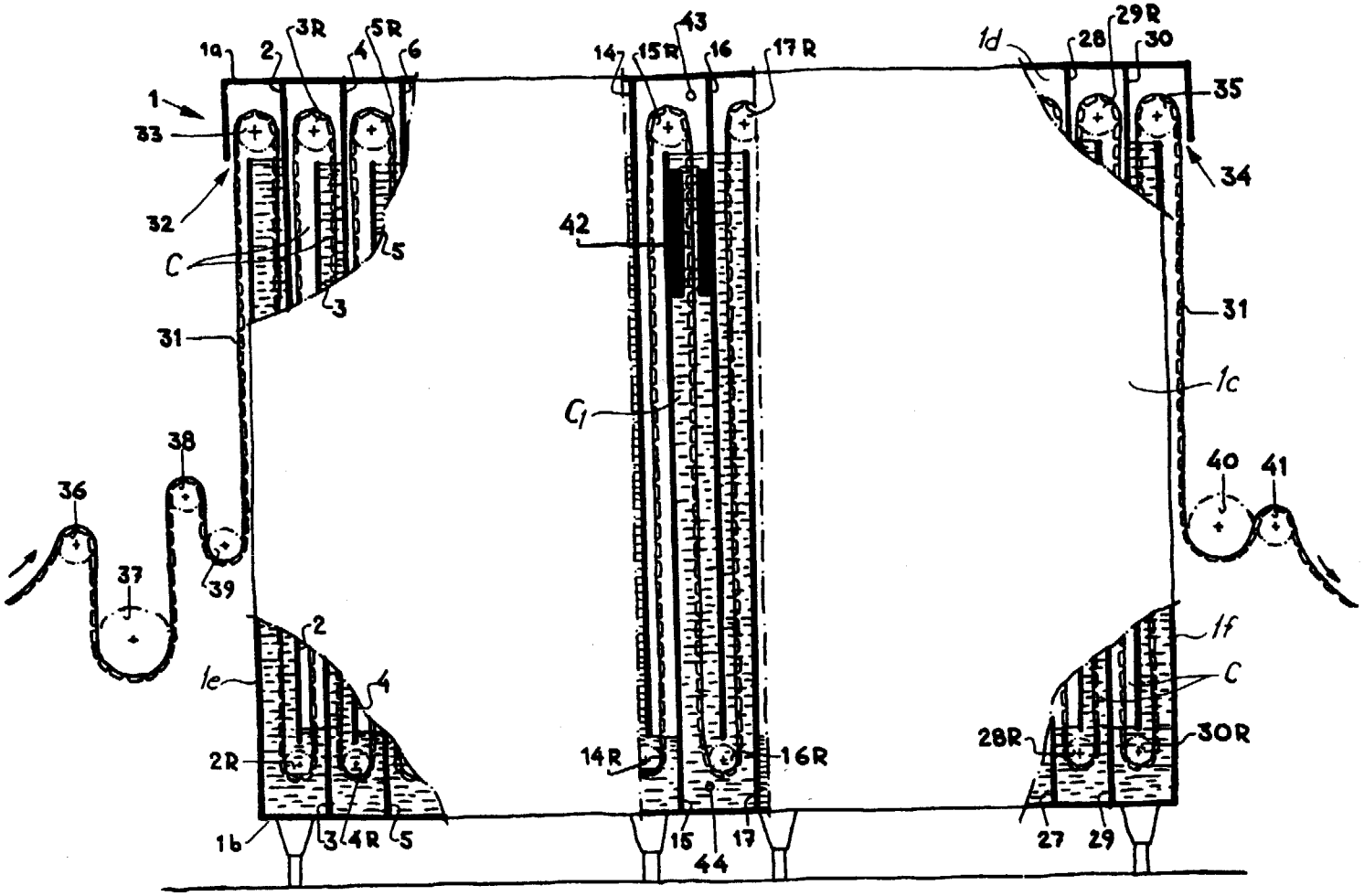

The invention is further described below with reference to the accompanying drawings in which FIGS. 1 and 2 illustrate how a cross-section of a product unit is influenced as to temperature during the different steps of a heating operation according to the invention, and FIG. 3 is a side elevational view, with parts broken away of an apparatus for performing the method according to the invention.

In FIG. 1, a rectangle A is shown, the horizontal short side of which represents the thickness of a product unit P, and the vertical long side of which represents the temperature present in the product unit in a starting condition. As can be seen, the product unit in this example has the same temperature all over its cross-section.

According to the invention, the product unit P is first subjected to a cooling medium during a certain period of time. This is illustrated in FIG. 1 by a rectangle B, the vertical extension of which represents the time during which the medium is kept in contact with the product unit. The result of this cooling can be seen from a figure C showing that the surface layer of the product unit has acquired a substantially lower temperature, while the temperature in the middle of the product unit is substantially unchanged. In this state (C) the product unit is then subjected to a field of electro-magnetic energy. The effect of this field is represented in FIG. 2 by a figure D, illustrating that the field heats a product unit situated therein substantially more in its surface layer than in its center. The result of the field influence (as to temperature) on the product unit previously cooled in its surface layer can be seen from a figure E, showing that the product unit now has acquired a high and substantially even temperature.

Depending upon the temperature distribution in the product unit in the starting condition, after a possible pre-heating operation, the cooling of the product unit surface layer (as well as the heating in the electro-magnetic field) may be controlled so that the final result substantially corresponds to the temperature distribution in the product unit illustrated by the figure E.

As shown in FIG. 3, the apparatus comprises a housing 1 which contains a large number of vertical, parallel partitions 2 through 30. The even-numbered partitions 2, 4, 6 . . . 30 are fixed to the top 1a of the housing 1 and extend downward to a point slightly above the bottom 1b of the housing, while the odd-numbered partitions 3, 5, 7 . . . 29 are fixed to the bottom 1b of the housing and extend between the other partitions upward to a point slightly below the top 1a of the housing. The partitions 2–30 extend from a front wall 1c of the housing to a rear wall 1d, the housing also having opposite end walls 1e and 1f.

Thus, the housing and its vertical partitions constitute means forming a series of vertically elongated chambers C arranged in a row, with adjacent chambers communicating with each other alternately at their upper and lower portions along the row. Consequently, the chambers C form vertical parts of a continuous and sinuous channel, and this channel is closed except at its inlet end 32 and its outlet end 34.

Either supported by a special conveyor or interconnected only by means of packing material, products to be heat treated in the apparatus are movable through this channel from the left to the right with reference to FIG. 3. One row 31 of interconnected product units extends along the path which the product units are intended to follow through the apparatus. At the free end of each partition within the housing 1, a so-called deflector roll is arranged. The deflector roll opposite to the partition 2 is designated 2R, the deflector roll opposite to the partition 3 is designated 3R, etc. At the inlet 32 of the apparatus, there is arranged a deflector roll 33, and in the outlet 34 of the apparatus is a deflector roll 35. Before entering the apparatus, the products pass a number of deflector rolls 36–39; and after having moved through the apparatus, they pass other deflector rolls 40 and 41. The upper deflector rolls 3R, 5R . . . 29R, 33 and 35 are arranged to be driven synchronously by suitable means (not shown) whereby the product units 31 are transported through the sinuous channel of the apparatus.

The apparatus in FIG. 3 may be divided into three sections, one pretreating section comprising substantially what is to the left of the partition 15, one heating section comprising the chamber between the partitions 15 and 16, and one cooling section comprising substantially what is to the right of the partition 16. Product units to be treated in the apparatus will be pre-heated and heated to the desired heat treatment temperature in the pre-treating and heating sections and then cooled in the cooling section.

The product units in the heating section (i.e., between the partitions 15 and 16) are surrounded by a pressure which at least substantially corresponds to the vapor pressure arising within the products at the actual heat treatment temperature. For this purpose, the following arrangements are provided.

In the pretreatment section, all of those vertical chambers C through which products move downward within the housing are filled with liquid. The other chambers are filled with gas. In the chamber between the partitions 2 and 3, the gas pressure amounts to a value corresponding to the sum of the atmospheric pressure surrounding the apparatus and the pressure of the liquid column between the end wall 1e of the housing 1 and the partition 2. In the next gas-filled chamber (i.e., between the partitions 4 and 5), the pressure amounts to the sum of the gas pressure in the chamber between the partitions 2 and 3 and the pressure of the liquid between the partitions 3 and 4. In this way the pressure within the gas-filled chambers increases in the direction toward the heating section. Correspondingly, all those chambers C of the cooling section through which the products move upward in the housing 1 are filled with liquid, while the other chambers are filled with gas. According to the same principle as in the pretreatment section, the pressure in the gas-filled chambers of the cooling section increases in the direction from the outlet 34 of the housing toward the centrally situated heating section. Thus, products treated in the apparatus will meet a gradual pressure drop in the cooling section on their way to the outlet 34.

The centrally situated heating section C1, in which the total pressure amounts to about 3.8 bars, may be filled either with gas or with liquid. As shown in FIG. 3, it is filled with water. In the heating section C1, means 42 are arranged for applying an electromagnetic field, such as microwaves, between the partitions 15 and 16. The product units pass through this field, as shown in FIG. 3. The means 42 for applying this field may be conventional and therefore are shown only schematically.

The product units pass through this field entirely surrounded by liquid, i.e., surrounded not only as can be seen from the drawing but also as seen in the main direction of applying the field against the product units. This main direction in FIG. 3 is horizontal and parallel with the plane of the drawing.

The desired gas pressures in the different chambers C of the housing 1 can be provided in any suitable manner known to those skilled in the art. An example of an arrangement for this purpose is disclosed in a copending application of Lennart A. Stenstrom and Borje R. Rosenberg entitled "Rapid Heating of Products", such disclosure being incorporated herein by reference.

To perform the method of the invention, the temperatures in the liquid-filled chambers C are kept at predetermined values. For this purpose, inlets and outlets for liquid, valves, thermostat means, etc., may be arranged in any suitable manner, as will be understood by those skilled in the art. An example of such an arrangement is also disclosed in said copending application.

In the following, a temperature program for the apparatus according to the invention is described, which has been used when sterilizing product units of a special kind.

The product units consisted of minced meat which had been vacuum packed in thin material transparent to microwaves. The size of each product unit was 85×100×20 mm., and they were moved while interconnected only by means of packing material along the path 31 through the apparatus, at a speed of about 6 cm. per second. Along this path the product units, under gradually increasing pressure from the surrounding medium, passed through seven liquid baths separated from each other and having the following temperatures (°C.): 90; 90; 90; 80; 80; 70; 50. Each product unit, when leaving the seventh liquid bath, was heated to the following temperatures (°C.) measured at regular intervals along the line M—M in FIG. 1: 54.6; 61.1; 65.5; 67.7; 68.3; 67.7; 65.5; 61.1; 54.6. After having passed through the gas-filled chamber between the partitions 14 and 15, the temperatures had been equalized a little in the product units to the following values (°C.) measured along the line M—M in FIG. 1: 62.2; 62.9; 64.2; 65.4; 65.9; 65.4; 64.2; 62.9; 62.4. (If desired, the surface temperature of the product units may be prevented from rising above a predetermined value, or even be lowered further, in the gas-filled chamber by syringing the product units therein with liquid of a suitable temperature.)

In this state the product units entered the electromagnetic field applied by the means 42 in the upper part of the liquid-filled chamber between the partitions 15 and 16. Through an inlet 43, new liquid having a temperature of 62° C. was continuously supplied to this chamber, at the same time as heated liquid was discharged through an outlet 44 situated at a lower point in the same chamber. When the product units left the electromagnetic field, the temperatures therein along the line M—M amounted to (°C.): 133.8; 139.0; 133.6; 129.9; 128.7; 129.9; 133.6; 139.0; 133.8. The temperature of the liquid present in the field increased gradually in the moving direction of the product units, and amounted to 132° C. where the product units left the field. By means of the liquid in the chamber between the partition 15 and 16, the obtained temperature in the product units was then maintained until the product units had reached the lower part of this chamber, where the temperatures along the line M—M amounted to (°C.): 132.7; 133.3; 132.9; 131.9; 131.4; 131.9; 132.9; 133.3; 132.7. Thereafter, the product units entered the cooling section of the apparatus, where their temperature was lowered to about 10° C., the pressure of the surrounding medium being gradually decreasing.

I claim:

1. In the processing of a heat-sensitive product by heating it from substantially above 0° C. to a treatment temperature for sterilizing or pasteurizing, the method which comprises subjecting units of said product to the influence of a cooling medium and thereby placing each product unit in a condition wherein a surface layer thereof has a lower temperature than the inner portions thereof, and then subjecting each product unit to a field of electro-magnetic energy of at least microwave frequency to heat the unit from said condition to substantially said treatment temperature and while the unit is in a second medium acting to substantially equalize the heating effect of said field throughout the unit.

2. The method of claim 1, in which said cooling medium surrounds each product unit entirely.

3. The method of claim 1, in which said cooling medium is a liquid.

4. The method of claim 1, in which said second medium has a dielectric constant of at least half of that of the product unit in said field, said second medium surrounding the product unit at least along the boundary lines thereof as seen in a plane perpendicular to the direction of the main application of the field against the product unit.

5. The method of claim 4, in which said electro-magnetic field raises the temperature of said second medium from a starting temperature to substantially said treatment temperature during said electro-magnetic heating of the product unit.

6. The method of claim 4, which comprises also moving the product unit at one speed and said second medium at a different speed through the electro-magnetic field, said relative speeds being controlled to cause said second medium to be heated by the field to substantially said treatment temperature where the product unit leaves the field.

7. The method of claim 1, wherein each product unit is passed through a liquid bath of said cooling medium and then through a second liquid bath of said second medium.

8. The method of claim 1, in which said electro-magnetic heating of each product unit is continued sufficiently to give said surface layer a higher temperature than said inner portions thereof.

9. The method of claim 1, in which said product unit is packaged prior to said processing.

*10. The method of claim 1 in which the units are heated prior to being subjected to the influence of the cooling medium.*

*11. In the processing of a heat sensitive product by heating it from substantially above 0° C. to a treatment temperature for sterilizing or pasteurizing, the method which comprises subjecting units of said product to a preheating step, subjecting the preheated units to the influence of a cooling medium thus to place each product unit in a condition wherein a surface layer thereof has a lower temperature than the inner portions thereof, then subjecting each unit to a field of electro-magnetic energy of at least microwave frequency, while the unit is in a second medium having a temperature below the temperature of the surface of the unit and a dielectric constant at least half that of the product unit, to heat the unit substantially uniformly to treatment temperature.*

* * * * *